US007119838B2

(12) United States Patent
Zanzucchi et al.

(10) Patent No.: US 7,119,838 B2
(45) Date of Patent: Oct. 10, 2006

(54) METHOD AND IMAGER FOR DETECTING THE LOCATION OF OBJECTS

(75) Inventors: Peter John Zanzucchi, Mercer, NJ (US); Richard Morgan Moroney, III, Mercer, NJ (US); John Gregory Aceti, Mercer County, NJ (US); Timothy Allen Pletcher, Burlington, NJ (US); Herschel Clement Burstyn, Mercer, NJ (US)

(73) Assignee: Blue Marlin LLC, New York, NJ (US)

( * ) Notice: Subject to any disclaimer, the term of this patent is extended or adjusted under 35 U.S.C. 154(b) by 0 days.

(21) Appl. No.: 10/921,294

(22) Filed: Aug. 19, 2004

(65) Prior Publication Data

US 2006/0038892 A1 Feb. 23, 2006

(51) Int. Cl.
*H04N 5/235* (2006.01)
*H04N 5/228* (2006.01)

(52) U.S. Cl. .................................. 348/222.1; 382/165

(58) Field of Classification Search ............. 348/222.1, 348/208.14, 169; 382/165; 473/152, 150
See application file for complete search history.

(56) References Cited

U.S. PATENT DOCUMENTS

| | | | |
|---|---|---|---|
| 5,357,352 A | 10/1994 | Eschbach | |
| 5,416,513 A * | 5/1995 | Morisaki | 348/169 |
| 5,495,428 A | 2/1996 | Schwartz | |
| 5,903,318 A | 5/1999 | Demay et al. | |
| 5,911,003 A | 6/1999 | Sones | |
| 5,912,980 A * | 6/1999 | Hunke | 348/169 |
| 6,241,622 B1 | 6/2001 | Gobush et al. | |
| 6,320,173 B1 | 11/2001 | Vock et al. | |
| 6,390,934 B1 | 5/2002 | Winfield et al. | |
| 6,431,990 B1 | 8/2002 | Manwaring | |
| 6,458,035 B1 | 10/2002 | Katayama | |
| 6,459,495 B1 | 10/2002 | Silverbrook | |
| 6,488,591 B1 | 12/2002 | Gobush et al. | |
| 6,500,073 B1 | 12/2002 | Gobush et al. | |
| 6,506,124 B1 | 1/2003 | Manwaring et al. | |
| 6,520,864 B1 * | 2/2003 | Wilk | 473/152 |
| 6,533,674 B1 | 3/2003 | Gobush | |
| 6,542,645 B1 | 4/2003 | Silverbrook et al. | |
| 6,556,709 B1 * | 4/2003 | Kumar | 382/165 |
| 6,561,917 B1 | 5/2003 | Manwaring | |
| 6,579,190 B1 | 6/2003 | Yamamoto | |
| 6,592,465 B1 | 7/2003 | Lutz et al. | |
| 6,602,144 B1 | 8/2003 | Manwaring et al. | |
| 6,616,543 B1 | 9/2003 | Gobush et al. | |
| 6,639,628 B1 | 10/2003 | Lee et al. | |
| 6,665,454 B1 | 12/2003 | Silverbrook et al. | |
| 6,742,385 B1 | 6/2004 | Katayama | |

(Continued)

*Primary Examiner*—David Ometz
*Assistant Examiner*—Gevell Selby
(74) *Attorney, Agent, or Firm*—Bingham McCutchen LLP

(57) ABSTRACT

A device detects the location of objects in an environment by receiving an optical image and converting the optical image of the lost object into a color digital image. The device employs software to perform an analysis of the color digital image to detect the location of the one or more objects in the environment by using color and shape characteristics of the one or more objects. The software uses a range of the visible portion of the color space uniquely identified for the type of object in that environment and identifies those pixels in the color digital image that may be possible targets. Intensity of background and object size are used to exclude pixels as possible target objects.

24 Claims, 4 Drawing Sheets
(2 of 4 Drawing Sheet(s) Filed in Color)

U.S. PATENT DOCUMENTS

| | | |
|---|---|---|
| 6,758,759 B1 | 7/2004 | Gobush et al. |
| 6,764,412 B1 | 7/2004 | Gobush et al. |
| 6,781,621 B1 | 8/2004 | Gobush et al. |
| 6,786,420 B1 | 9/2004 | Silverbrook |
| 6,821,209 B1 | 11/2004 | Manwaring et al. |
| 2004/0170318 A1* | 9/2004 | Crandall et al. ............ 382/165 |
| 2004/0228524 A1* | 11/2004 | Okutsu et al. .............. 382/162 |

* cited by examiner

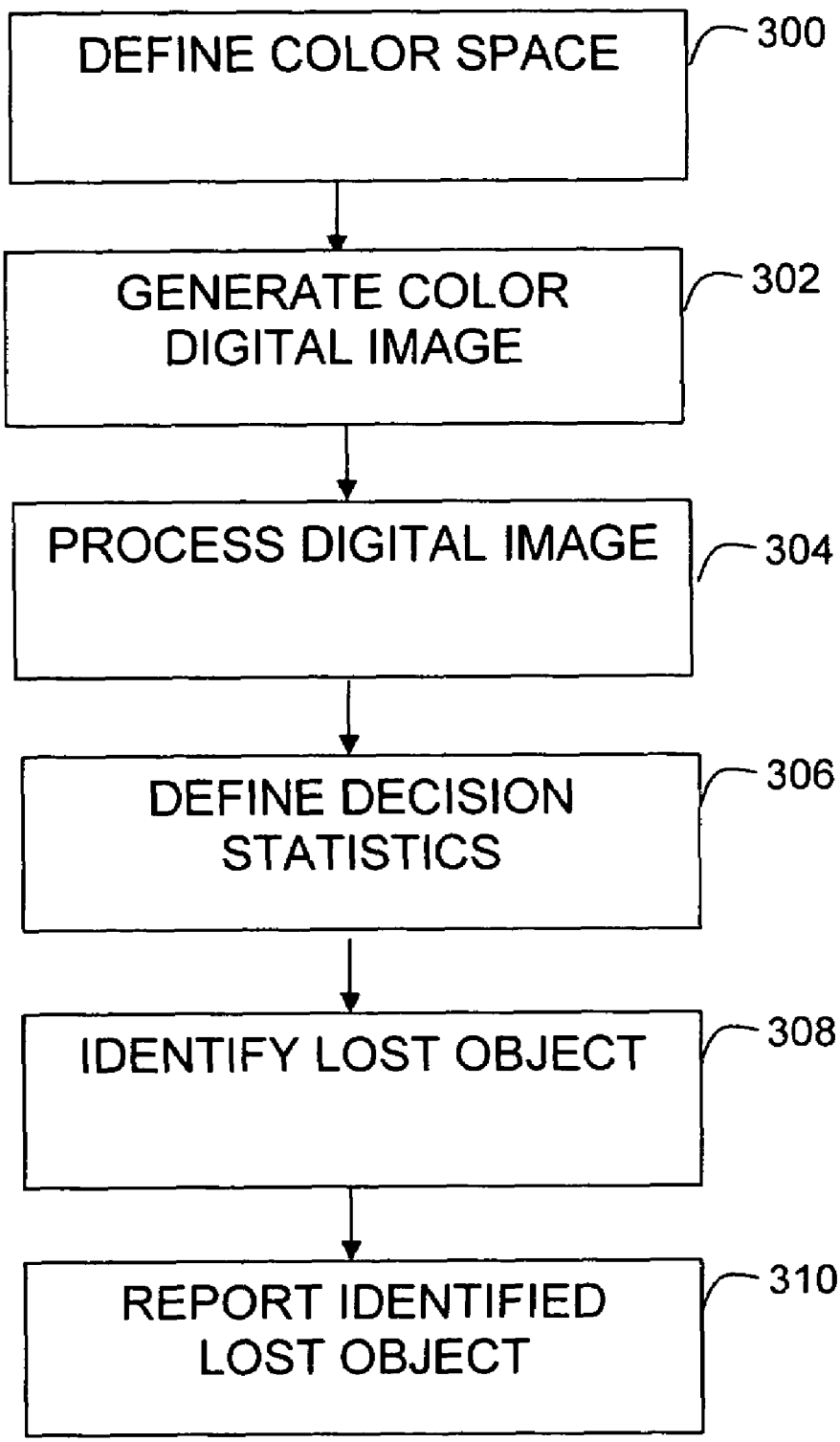

METHOD AND IMAGER FOR DETECTING THE LOCATION OF OBJECTS

BACKGROUND OF THE INVENTION

1. Field of the Invention

The present invention relates to a method, a system and a computer program product for detecting lost objects. More particularly, the present invention relates to a method, a device and a computer program product for detecting the location of lost objects in environments where the color of a lost object is not naturally found.

2. Description of the Prior Art

There are many circumstances where an object is lost and determining its location is difficult due to the characteristics of the environment in which it has been lost. One such circumstance occurs during the playing of the sport of golf. Typically, the sport of golf is played on terrain having a variety of characteristics, such as grass, sand, trees, water, a specified distance, etc. It is not uncommon for a golf ball to become lost while playing golf due to the characteristics of the environment in which it is played. Once a golf ball is lost, a substantial amount of time can be spent trying to find it. This results in an increase of playing time for the player who lost the ball, as well as other players playing behind or with the player. In cases where the golf ball cannot be located, the player who lost the ball is accessed a penalty stroke increasing the player's final score.

Accordingly, there is a need for a device that detects the location of an object in an environment having a variety of characteristics. There is further need for the device to be mobile. There is a further need for the device to detect the location of an object over long distances. There is a need for the device to be operable in a variety of lighting conditions. There is a need for the device to reduce glare and related image artifacts. There is a need for the device to reduce multiple reflections and shadowing in the detection of the object. There is a need for the device to decrease the amount of time required to locate an object.

SUMMARY OF THE INVENTION

According to embodiments of the present invention, a method, a device and a computer program product for detecting the location of an object in an environment are provided. The method receives an optical image and converts the optical image of the object into a color digital image consisting of charged signals, where each charged signal was generated by a pixel in an array of a Charged Coupler Device (CCD) by photoelectric conversion. The color digital image depicts one or more similar lost objects in a particular environment. Software performs an analysis of the color digital image to detect the location of the one or more objects in the environment by using color and shape characteristics of the one or more objects. The software uses a range of the visible portion of the color space uniquely identified for the type of object in that environment. The range of the color space is based at least in part on the color spaces identified for the object type under various lighting conditions in the environment where the type of object would be lost. The color spaces for the object are identified by analyzing the color spaces of color digital images of the object type under the various lighting conditions in a training mode and storing the color spaces identified in association with the object type. The analysis includes comparing the color space of each pixel in the color digital image with each of the color spaces in the range of color spaces to determine if there is a match. Once a match is determined the location of that pixel is recorded. Recorded pixels are analyzed to determine whether there are clusters of pixels with the sought features. If pixel clusters are identified, the size of the cluster of pixels is compared to the size characteristics of the object type to determine the likelihood of the pixel cluster being the lost object. The image may be filtered using polarization to eliminate glare.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above described features and advantages of the present invention will be more fully appreciated with reference to the detailed description and appended figures in which:

FIG. 3 depicts an exemplary flow diagram for detecting the location of an object in an environment according to an embodiment of the present invention.

DETAILED DESCRIPTION OF THE INVENTION

The present invention is now described more fully hereinafter with reference to the accompanying drawings that show embodiments of the present invention. The present invention, however, may be embodied in many different forms and should not be construed as limited to embodiments set forth herein. Appropriately, these embodiments are provided so that this disclosure will be thorough and complete, and will fully convey the scope of the present invention.

According to embodiments of the present invention, a method, an image taking device and a computer program product for detecting the location of an object in an environment are provided. The method receives an optical image and converts the optical image of the object into a color digital image consisting of charged signals, where each charged signal was generated by a pixel in an array of a Charged Coupler Device (CCD) by photoelectric conversion.

The color digital image depicts one or more similar objects in a particular environment where the objects may be lost. Software performs an analysis of the color digital image to detect the location of the one or more objects in the environment by using color and shape characteristics of the one or more objects. The software uses a range of the visible portion of the color space uniquely identified for the type of object in that environment. The range of the color space is based at least in part on the color spaces identified for the object type under various lighting conditions in the environment where the type of object could be lost. The color spaces for the object are identified by analyzing the color spaces of color digital images of the object type under the various lighting conditions in a training mode and storing the color spaces identified in association with the object type. The analysis includes comparing the color space of each pixel in the color digital image with each of the color spaces in the range of color spaces to determine if there is a match. Once a match is determined the location of that pixel is recorded. Recorded pixels are analyzed to determine whether there are clusters of pixels. If pixel clusters are identified, the size of the cluster of pixels is compared to the size characteristics of the object type to determine the likelihood of the pixel cluster being the lost object. The image may be filtered using polarization to eliminate glare.

Figure 1:
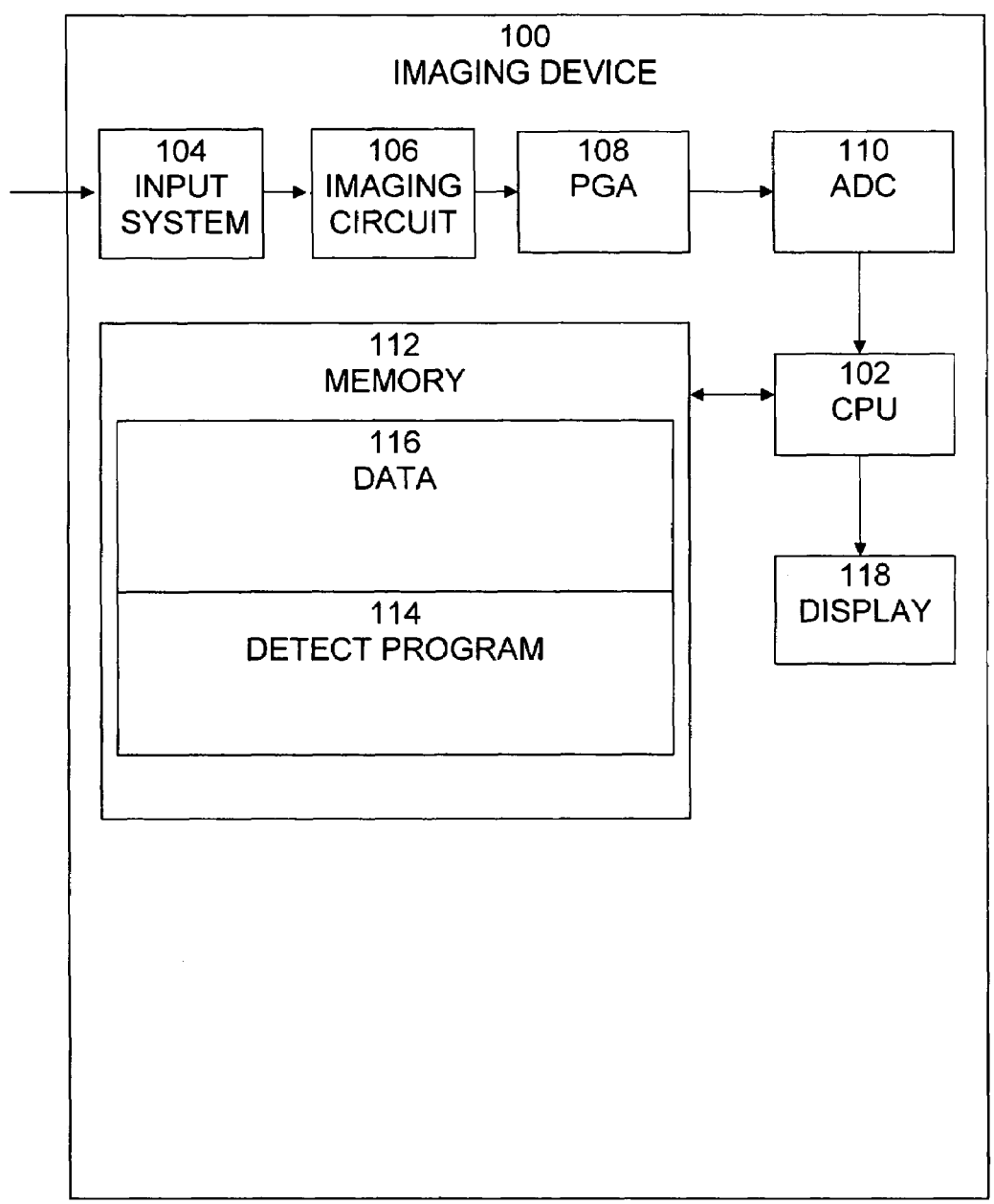
FIG. 1 depicts an exemplary functional block diagram of a device in which the present invention can find application.

FIG. 1 depicts a functional block diagram of an image taking device in which the present invention can find application. In the embodiment of FIG. 1, image taking device 100 can be implemented to detect the location of an object in a particular environment, such as a golf ball on a golf course. In the FIG. 1 embodiment, image taking device 100 is a system, such as a digital camera, digital video camera, or the like, but can be any apparatus that executes program instruction in accordance with the present invention. In an embodiment of the present invention, the image taking device 100 is hand-held. In an embodiment of the present invention, the image taking device 100 is mountable on a mobile object, such as a golf cart, aircraft, or automobile. In an embodiment of the present invention, the imaging device 100 is positioned at a fixed location, such as a position of the green of a hole on a golf course.

In the FIG. 1 embodiment of the present invention, the image taking device 100 includes a processor (CPU) 102, an input system 104, imaging circuitry 106, programmable gain amplifier (PGA) 108, analog-to-converter 110, memory 112, data 116, and display 118. In the FIG. 1 embodiment, the input system 104 is a digital image system. The input system 104 provides an interface for acquiring object light or light depicting an object and forming an image. The input system 104 includes imaging optics that may be set to satisfy the Scheimpflug Condition and a charge-coupled device sensor having a plurality of pixels. In the Scheimpflug Condition, the object plane, the image plane, and the median plane all intersect at a common point through the lens. This condition has the effect that an object plain is mapped onto a non-parallel image plane. The advantage of this condition is the ability to focus on the ground where we expect the lost object (for example, a golf ball) to be located with significantly improved depth of focus.

The input system 104 is coupled to circuitry 106 and provides an analog image signal to the circuitry 106. The circuitry 106 samples the analog image signal and extracts the voltage that is proportional to the amount of light which fell on each pixel of the charge-coupled device sensor of the input system 104 using color components R (red), G (green) and B (blue). Programmable gain amplifier (PGA) 108 is coupled to circuitry 106, amplifies the voltages to the proper range and provides the voltages as input to analog-to-converter 110. Analog-to-digital converter (ADC) 110 is coupled to CPU 102 and converts the voltage to a digital code suitable for further digital signal processing by CPU 102. The CPU 102 is a microprocessor, such as an INTEL PENTIUM® or AMD® processor, but can be any processor that executes program instructions in order to carry out the functions of the present invention.

In the FIG. 1 embodiment, the memory 112 is coupled to CPU 102 and stores object detecting program 114 and data 116. The data 116 includes, but is not limited to, color digital images depicting one or more similar objects in a particular environment, a set of color space ranges, where each color space range in the set of color space ranges is uniquely identified for a type of object, and the color space of one or more pixels of the color digital images.

In the FIG. 1 embodiment, the object detecting program 114 provides the functionality associated with detecting the location of an object in a particular environment as executed by the CPU 102. The object detecting program 114 is designed to report detection of an object's location in the color digital image, such as on a display 118.

Figure 2:
FIG. 2 depicts an exemplary color digital image taken with the device depicted in FIG. 1.

FIG. 2 depicts an exemplary color digital image taken with the device depicted in FIG. 1. In FIG. 2 the color digital image 200 shows golf balls 202a–202d distributed on terrain with grass.

An exemplary flow diagram of an embodiment for detecting the location of an object in a particular environment is shown in FIG. 3. FIG. 3 is best understood when read in combination with FIG. 1. As shown in FIG. 3, the process begins with step 300, in which a target color space for the type of object is defined based on the observed R, G, B levels in a series of reference images. The series of reference images are taken several times under various conditions to determine a desirable target color space. This training produces slightly different color spaces. Using a set of reference pictures increases the robustness of our approach relative to using just a single image. In the case of typical golf balls, this results in a "white" space. This space may be a restricted set from the universe of observed colors, such as the space of colors that together account for 50% of all observations. The color space uses two of the three available degrees of freedom in the RGB measurement.

In defining a target color space, color shifts caused by the specific lighting conditions of the particular type of object must be considered and included in the target color space for the type of object. Accordingly, the color shifts of the type of object must be determined. This includes color shifts caused by "global" lighting, such as sunny versus cloudy weather, as well as "local" lighting, such as in grass or under a bush. For purposes of our invention, we define "white" as the color of a typical golf ball.

Figure 4A:
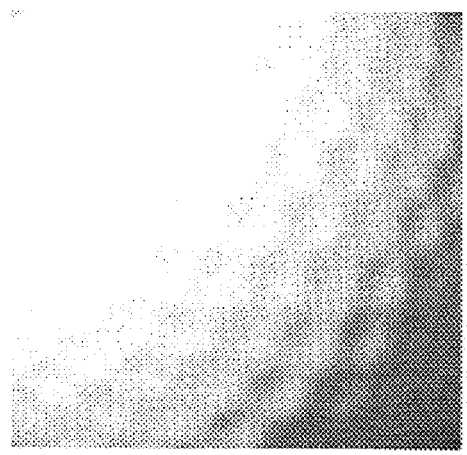
FIGS. 4a–4d depict exemplary color space diagrams of an object shown in a color digital image.
Figure 4B:
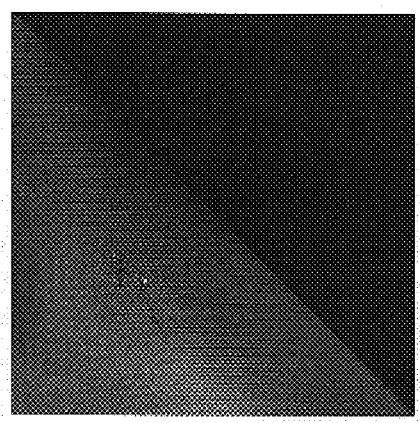
Figure 4C:
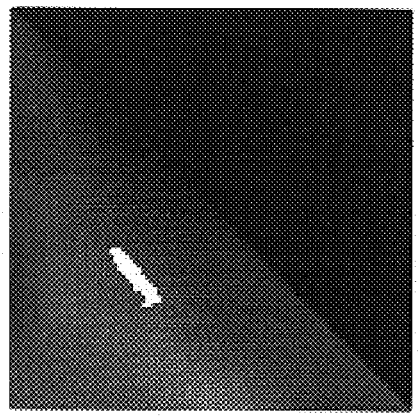
Figure 4D:
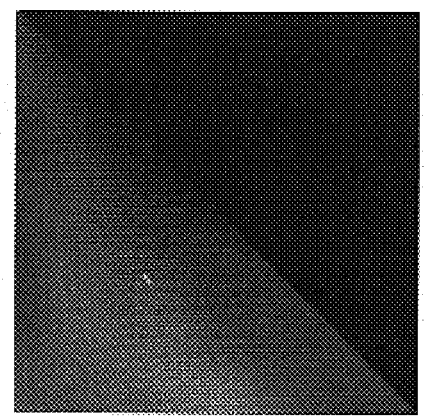

Turning here briefly to FIG. 4a–4d, where an exemplary color space diagram depicts the corresponding color space of a ball in a color digital image. In the FIG. 4 embodiment, the color space diagram 4b shows colors that in the picture 4a are provided in a shade of gray. The shade level gives an indication of the relative frequency of that particular color, with dark gray having few occurrences and white having many occurrences. This is due to the different color temperatures of the illumination. An automatic white balance feature to correct for color shifts may be provided on device 100 where the user can optionally select its operation. In the FIG. 4c embodiment, a subset of the color space of FIG. 4b is shown where only the colors that constitute 99% of the pixels are selected and represented in white by FIG. 4d. In the FIG. 4d embodiment, a subset of the color space of FIG. 4b is shown where only the colors that constitute 50% of the pixels are selected and represented in white by FIG. 4d.

Returning here to FIG. 3, in step 302 a digital color image of an environment where the object is thought to be located is generated. This includes, but is not limited to, acquiring object light or light depicting an object and forming an image, providing an analog image signal for extraction of voltage which is proportional to the amount of light which fell on each pixel of a charge-coupled device sensor using color components R, G, and B, and converting the voltage to a digital code suitable for further digital signal processing. In an embodiment of the present invention, a light source may be used to shift the color space back into a regular detection range and to raise the light intensity from a ball resting in a shadow back up to the high levels expected if it was not shaded. One having ordinary skill in the art would understand that the light source can be a UV light source where device 100 employs UV color space. In step 304, the digital color image is processed to detect the location of the object in the environment. This includes, but is not limited to, comparing the color space of each pixel in the color digital image with the target color space defined for the type of object and storing the location of the pixels whose color space matches a color space in the defined target color space for the type of object.

In step 306, a decision statistic is defined that represents the likely characteristics of the type of object. In an embodiment of the present invention, the intensity of the background can be used as a decision statistic. The intensity of the background can be determined by processing the color digital image a second time. With an image-specific histogram of the background intensity, a lower-bound threshold for the expected target intensity can be defined, such as at the 90%, 95%, or 99% level of the background intensity. The pixels whose locations are stored can be screened using this criterion, with those pixels not meeting the intensity specification removed.

In an embodiment of the present invention, the size of the type of object can be used as a decision statistic. The size of the type of object can be used to identify the object by determining the diameter, such as a golf ball measured in pixels. This value can serve as a cluster distance. The pixels whose locations are stored can be screened using this criterion by collecting into groups, or clusters, those pixels that are within a cluster distance of each other.

In step 308, it is determined whether the object is identified in the environment based on one or more statistics. A statistic includes color space information, and may also include intensity information and/or cluster information. A statistic may also include weighting values from any reference images collected. The preferred approach is to define one statistic, but it is obvious that multiple statistics could be defined and used with this method. In step 310, the object is reported if identified, such as by display 118.

While specific embodiments of the present invention have been illustrated and described, it will be understood by those having ordinary skill in the art that changes can be made to those embodiments without departing from the spirit and scope of the invention. For example, while the present invention concentrates on a single color digital image and stationary lost object analysis, it is understood that information from a series of images, a moving object or a specific object might advantageously be used as well. Also, while our application to golf balls has us discussing UV and visible light, the method is not dependent on this choice.

We claim:

1. A method of detecting the location of at least a portion of a stationary object in an environment having stationary objects, the method comprising:
    defining a target color space uniquely identified for the type of object that is stationary based on observed R,G,B levels in a series of reference digital color images of the type of object that is stationary in the environment;
    generating a live color digital image of the environment;
    determining whether there are a set of pixels in the live digital color image of the environment that are within the target color space defined for the type of object that is stationary; and
    reporting the determination that there are a set of pixels within the target color space defined for the type of object that is stationary;
    wherein the set of pixels corresponds to the location of the at least a portion of the stationary object in the environment.

2. The method according to claim 1, wherein the color digital image is generated by one of: a digital camera and a digital video camera.

3. The method according to claim 2, further comprising providing a light source for illuminating the environment.

4. The method according to claim 1, wherein the object is white or any acceptable color for which RGB components may be determined.

5. The method according to claim 4, wherein the stationary object is a golf ball.

6. The method according to claim 5, wherein the environment includes at least one of: grass, bushes, trees, and sand.

7. The method according to claim 1, further comprising determining whether the set of pixels determined as within the target color space defined for the type of the stationary object satisfy a characteristic of the object.

8. The method according to claim 1, wherein the characteristic is one of: a size, color intensity and a shape.

9. The method according to claim 1, wherein defining the target color space includes generating the series of reference digital color images of the type of the stationary object.

10. The method according to claim 1, further comprising storing the target color space.

11. The method of claim 1, wherein the digital color image is one digital color image in a series of digital color images.

12. The method of claim 1, wherein the determination that there are a set of pixels within the target color space defined for the type of object is reported by one of: a visual display, a tactile alert, a sound alert, and an odorous alert.

13. An apparatus for detecting the location of at least a portion of a stationary object in an environment having stationary objects, the apparatus comprising:
    a processor operable to execute computer program instructions; and
    a memory operable to store computer program instructions executable by the processor, for performing the steps of:
    defining a target color space uniquely identified for the type of object that is stationary based on observed R,G,B levels in a series of reference digital color images of the type of object that is stationary in the environment;
    generating a live color digital image of the environment;
    determining whether there are a set of pixels in the live digital color image of the environment that are within the target color space defined for the type of object that is stationary; and
    reporting the determination that there are a set of pixels within the target color space defined for the type of object that is stationary;
    wherein the set of pixels corresponds to the location of the at least a portion of the stationary object in the environment.

14. The apparatus according to claim 13, wherein the color digital image is generated by one of: a digital camera and a digital video camera.

15. The apparatus according to claim 14, further comprising means for providing a light source for illuminating the environment.

16. The apparatus according to claim 13, wherein the object is white or any acceptable color for which RGB components may be determined.

17. The apparatus according to claim 16, wherein the stationary object is a golf ball.

18. The apparatus according to claim 17, wherein the environment includes at least one of: grass, bushes, trees, and sand.

19. The apparatus according to claim 13, further comprising determining whether the set of pixels determined as within the target color space defined for the type of the stationary object satisfy a characteristic of the object.

20. The apparatus according to claim 19, wherein the characteristic is one of: a size, color intensity and a shape.

21. The apparatus according to claim 13, wherein defining the target color space includes generating the series of reference digital color images of the type of object.

22. The apparatus according to claim 13, further comprising means for storing the target color space.

23. The apparatus of claim 13, wherein the digital color image is one digital color image in a series of digital color images.

24. The apparatus of claim 13, wherein the determination that there are a set of pixels within the target color space defined for the type of object is reported by one of: a visual display, a tactile alert, a sound alert, and an odorous alert.

* * * * *